United States Patent [19]
Grabbe

[11] Patent Number: 5,217,728
[45] Date of Patent: Jun. 8, 1993

[54] HIGH DENSITY MOLD

[75] Inventor: Dimitry G. Grabbe, Middletown, Pa.

[73] Assignee: AMP Incorporated, Harrisburg, Pa.

[21] Appl. No.: 720,126

[22] Filed: Jun. 21, 1991

[51] Int. Cl.⁵ .................... B29C 33/00; B29C 39/36
[52] U.S. Cl. .................................. 425/443; 249/64; 425/468; 425/556; 425/577
[58] Field of Search ............ 425/554, 556, 577, 436, 425/436 RM, 438, 441, 443, 444, DIG. 58, 468; 249/64, 67, 176, 177

[56] References Cited

U.S. PATENT DOCUMENTS

| | | | |
|---|---|---|---|
| 3,004,291 | 10/1961 | Schad | 425/443 |
| 3,192,578 | 7/1965 | McCormick | 425/441 |
| 3,278,152 | 10/1966 | Miller et al. | 249/64 |
| 3,509,603 | 5/1970 | Halsall et al. | 425/441 |
| 3,669,598 | 6/1972 | Tucker | 425/556 |
| 4,706,924 | 11/1987 | de Larosiere | 425/556 |
| 4,819,476 | 4/1989 | Bakermans et al. | 72/407 |
| 4,957,800 | 9/1990 | Grabbe | 428/136 |
| 5,074,779 | 12/1991 | Tsutsumi et al. | 425/556 |

Primary Examiner—Jay H. Woo
Assistant Examiner—Robert B. Davis
Attorney, Agent, or Firm—Allan B. Osborne; Bruce J. Wolstoncroft

[57] ABSTRACT

A high density mold (8), for molding preforms having a high density of very small openings, having: a core pin sub-assembly (10) made from a number of plates (16) having core pins (18) extending outwardly from an edge of each plate; and, a stripper assembly (40) that is composed of a stripper sub-assembly (14), formed by bonding thin sheets (34) with apertures (36) corresponding to the core pins (18), and a support sub-assembly (12), formed by a number of plates (24) with spacers to define spaces (26) for the core pins (18), the stripper sub-assembly (40) slides along the core pins (18) to strip the molded preforms from the core pin sub-assembly (10).

9 Claims, 3 Drawing Sheets

HIGH DENSITY MOLD

FIELD OF THE INVENTION

The present invention relates to a high density mold, a method of making an extremely complex mold having a large number of very small apertures on a very tight spacing and a method of use.

BACKGROUND OF THE INVENTION

Computers now have very high speed signal requirements which have resulted in a number of attempts to provide controlled impedance in the form of flexible circuitry (FEC) electrically connecting two circuit boards. In one such attempt, Middco Connectors of the Middleburg Corporation has designed a connector using FEC and hydraulic pressure to provide the required normal forces. Mechanically driven cams drive pressure plugs in windows through glands to squeeze bladders which press against the FEC.

In another attempt, the use of a memory alloy provided the means for clamping or releasing the clamping of a circuit card and for applying the normal force.

The disadvantages of these attempts include both technical and economical. Neither can provide wipe. With regard to the first mentioned connector, besides the costs involved, particular care must be given to provide a constant temperature so as not to induce pressure variations over time. With regard to the memory alloy strip, because it is a solid preform, it cannot be compliant for each individual contact pad on the film and an intervening layer of an elastomer is required. This solution has its own problem in that over time, elastomers tend to creep or relax so that the effectiveness become diminished.

A solution is in providing a connector using a conservative and traditional design wherein each discrete contact is made of a spring tempered metal whose stress relaxation and creep properties are negligible and also well understood. Further, such contacts has its own stored energy to provide a continuous and uniform force over long periods of time. However, the problem arises in the difficulty and high cost of manufacturing a mold with a large number of very thin core pins; e.g., 0.005 inches, on a dense grid; e.g., 0.050 inches with which connector housings can be made. The traditional way of making a mold would be to have a core pin holding plate in which slots or holes have to be machined accurately to contain and retain the core pin which may be for example, 0.005 inches by 0.100 inches. The plate must be of substantial strength and therefore thick, to withstand the stripping force; i.e., ejection resistances, for removing a molded plastic article from the multitude of core pins. Making such a plate is extremely difficult and costly. Accordingly, it is now proposed to provide a new method for constructing and producing a mold of such extreme complexity.

SUMMARY OF THE INVENTION

According to the present invention, a high density mold is provided which includes three sub-assemblies. The first includes a number of thin plates fastened together having core pins extending outwardly from an edge of each. A second sub-assembly is formed from plates with spacers between each to define spaces for slidingly receiving the core pins. The third sub-assembly is a stack of thin plates having slits therethrough which slidingly receive the core pins. The second and third sub-assemblies form an assembly which slides on the core pins to strip molded preforms therefrom.

A method of making the mold and the use thereof are also disclosed.

DESCRIPTION OF THE INVENTION

Figure 1:
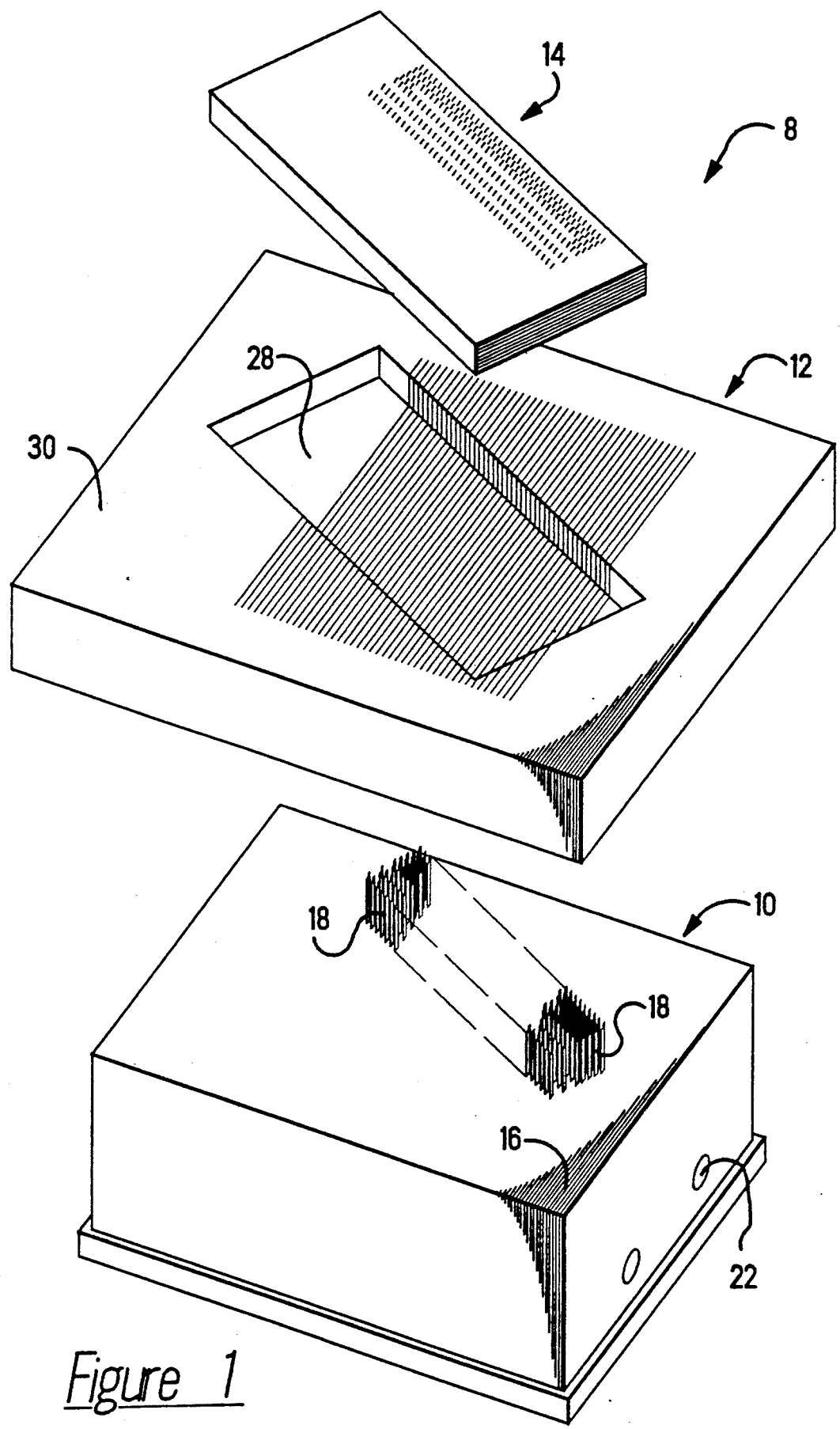
FIG. 1 is a view of the major components of the high density mold of the present invention.

With reference to FIG. 1, the major components of high density mold 8 include core pin sub-assembly 10, support sub-assembly 12 and stripper sub-assembly 14.

Figure 2:
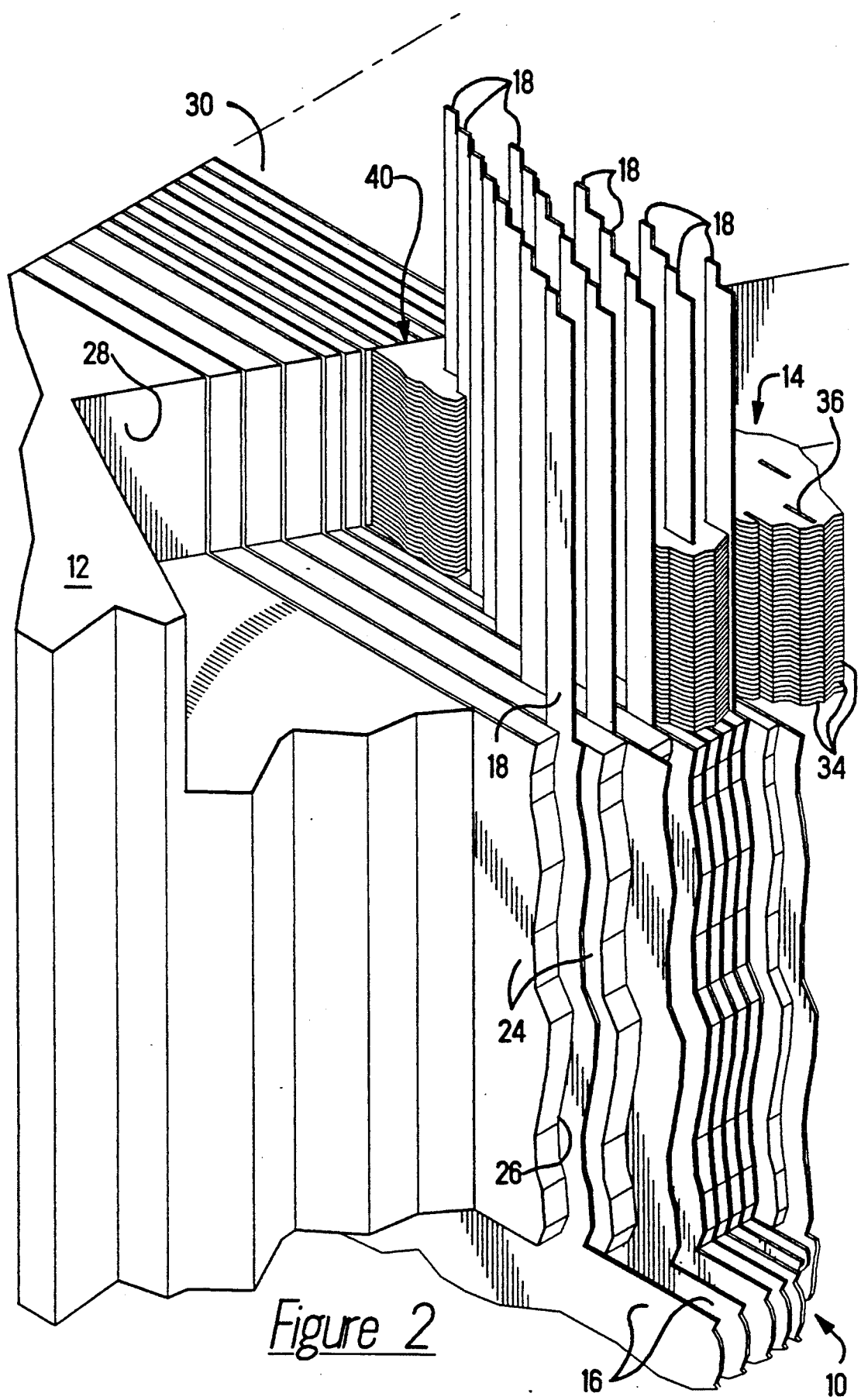
FIG. 2 is a view showing the construction of the stripper stack, core pins and stripper support member.

With reference also to FIG. 2 now, sub-assembly 10 is formed by first stacking a number of plates 16 together (not shown) and contouring (not shown) core pins 18 along one edge. As is apparent from FIG. 2, a number of stacks (not shown) will be so contoured to produce the required pattern of pins 18. The contouring may be readily accomplished by using WEDM technology (Wire EDM or Wire Electro-Discharge Machining) or other well known cutting techniques. Next, spacers (not shown) of the required thickness are positioned adjacent the base of and between plates 16 which have been arranged to provide the required core pin pattern. Fastening devices, such as bolts 22, secure the spacers and plates 16 together and superfluous pins 18 are removed to define the complex, multi-point sub-assembly 10.

Plates 16 are assembled and positioned in the non-moving mold section of a mold apparatus (N-S-) in a vertical orientation; i.e., parallel to the direction of travel of the moving mold section (not shown).

Support sub-assembly 12 is formed from a number of plates 24 with spacers (not shown) therebetween to provide spaces 26 having a width only very slightly greater than that of plates 16 and pins 18. Plates 24 and the spacers may be bonded or otherwise secured together by conventional techniques.

As shown in the drawings, cavity 28 is provided in surface 30 of sub-assembly 12. Cavity 28 is preferably formed by contouring plates 24 before being assembled together.

Striper sub-assembly 14 is composed of a number of thin sheets 34 having multiple slits or apertures 36 cut therethrough for example by photochemical machining. Apertures 36 are in the same pattern as core pins 18 and have a dimension such that there is a tight sliding fit there between. Sheets 34 are plated with solder or a brazing material by means such as electroplating, or coated with adhesive, stacked in a fixture in proper alignment and fused together under heat and pressure to form the sub-assembly 14. Its dimensions are such as to be conformably received in cavity 28 in sub-assembly 12 to form in combination stripper assembly 40. As shown, sheets 34 are normal to the plates 24 of sub-assembly 12.

Figure 3:
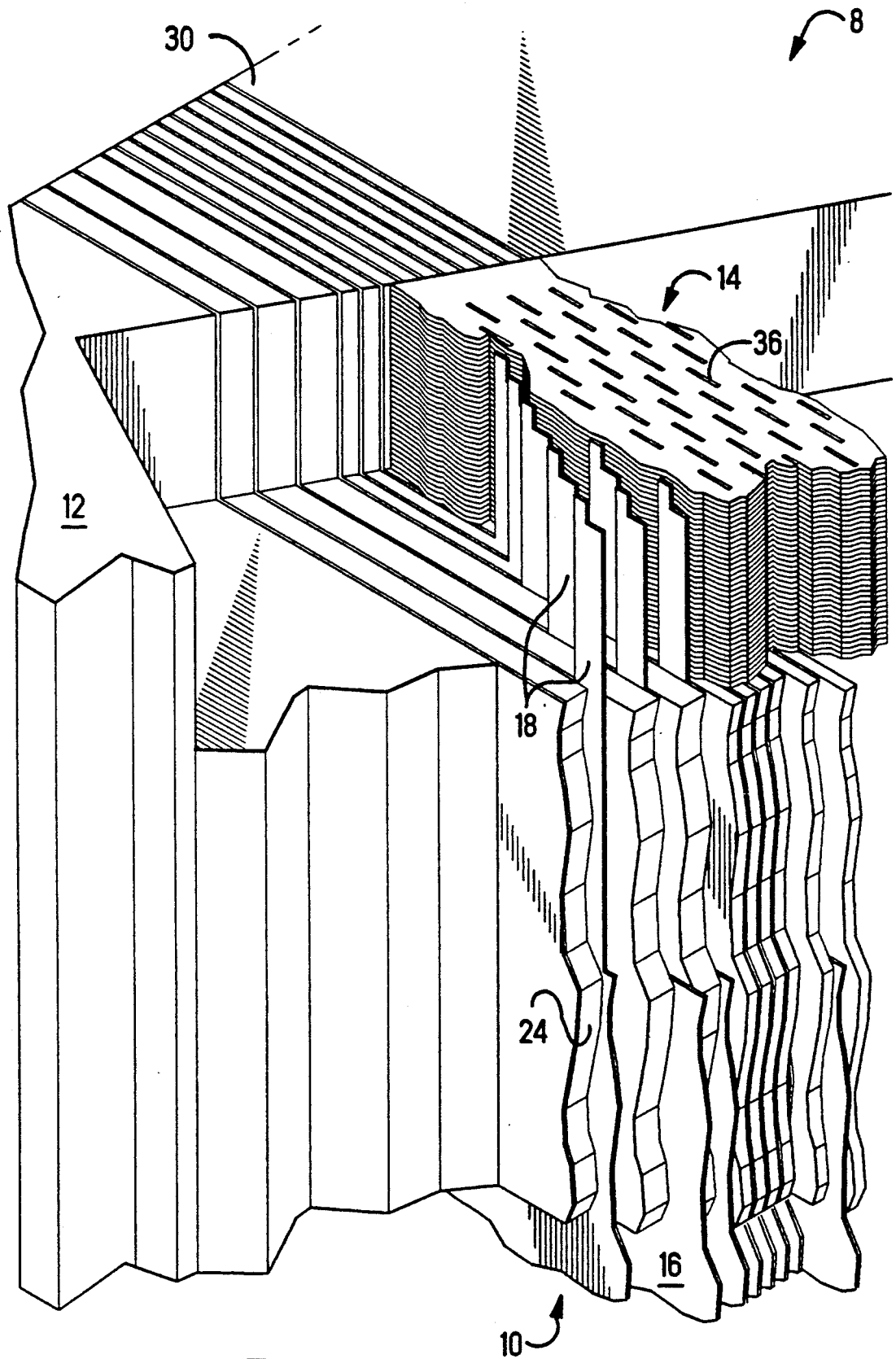
FIG. 3 is another view of the stripper stack, core pins and stripper support member.

In practice, stripper assembly 40 is moved up and down on core pins 18 as indicated in FIG. 3. That is, at the start of a molding step, core pins 18 extend up through assembly 40 and into the cavity of the moving mold section (not shown). During the injecting and hardening of the plastics material, apertures 36 remain free thereof because of the close fit of core pins 18 therein.

After hardening, assembly 40 is moved up, effectively stripping the molded part (not shown) from core pins 18.

In one proposed method of stripping, stripper assembly 40 is assembled in one mold section (not shown) in the manner of a piston in an enclosed space or chamber and is held against the moving mold section by compressed air or other gas. As the mold apparatus begins to open, assembly 40, under the effect of the compressed medium, will move along with the moving mold section. Upon reaching the ends of core pins 18; i.e., at the point where the preform is essentially stripped, assembly 40 will have moved past an aperture or orifice in the cylinder wall and the compressed medium will be exhausted.

The moving mold section will continue to open and the molded part can be ejected therefrom using traditional ejection pins.

As can be discerned from the foregoing, a method for making a mold for molding parts having a high density of small openings therethrough has been disclosed. Extremely fine core pins are contoured out from edges of thin plates stacked side by side and arranged in a predetermined pattern with spacers between the plates. This sub-assembly is held together by conventional means and is secured in one section of a molding apparatus. A second support sub-assembly is made by placing plates side by side with spacers therebetween to define spacers which slidingly receive the core pins. A cavity is contoured from one surface of this support sub-assembly to receive a stripper sub-assembly. The stripper sub-assembly comprises a number of thin sheets stacked on top of each other and having apertures or apertures machined therethrough to slidingly receive the core pins.

In one method of use, an assembly comprising the support and stripper sub-assemblies move up to strip a molded part off the core pins.

I claim:

1. A high density mold for molding parts having a high density of small openings therethrough, comprising:
   a first sub-assembly having a plurality of plates having core pins extending outwardly from one edge, said core pins being arranged in a given pattern and adapted to provide small openings in the molded pars, said plates having a thickness essentially equal the width of the core pins; and,
   a stripper assembly having
   a stripping sub-assembly having a plurality of thin plates stacked on top of each other and to form a block, each thin plate having apertures arranged in the given pattern to slidingly receive the core pins; and
   a support sub-assembly having a plurality of plates stacked together with spacers therebetween for defining spaces for slidingly receiving therethrough the core pins and their respective plates, said support sub-assembly disposed between the first sub-assembly and the stripping sub-assembly and further adapted to provide reciprocal movement of the stripping sub-assembly on the core pins whereby the motion of the stripper assembly causes the molded parts to be removed from the core pins.

2. The mold of claim 1 wherein the core pins are 0.005 inches thick.

3. The mold of claim 1 wherein the given pattern is on a 0.050 inch grid.

4. A high density mold for molding parts having a high density of small openings, comprising:
   a first sub-assembly comprising a plurality of plates with at lest some of said plates having core pins extending outwardly from one edge, said core pins being arranged in a given pattern;
   an assembly for moving reciprocally on said core pins comprising a support sub-assembly and a stripper sub-assembly, said support sub-assembly comprising a number of plates secured together with spacers therebetween to define spaces to slidingly receive said core pins and said stripper sub-assembly comprising a block formed from thin sheets bonded together with said sheets being provided with apertures in said given pattern.

5. The mold of claim 4 wherein said support sub-assembly includes an outwardly opened cavity for receiving said stripping sub-assembly therein.

6. The mold of claim 4 wherein said plates of said stripping sub-assembly are bonded together to form the block by an adhesive.

7. The mold of claim 4 wherein said plates of said stripping sub-assembly are bonded together to form the block by soldering.

8. A mold for molding parts, comprising;
   a first means comprising a plurality of core pins extending outwardly from a plurality of plates; and
   a second means comprising a plurality of thin sheets bonded together and having apertures for slidingly receiving said core pins, said apertures extending through said sheets from one surface to another.

9. The mold of claim 8 further including a third means comprising a plurality of plates with spacers therebetween to provide spaces for slidingly receiving said core pins, said third means being disposed between said first and second means and movable with said second means reciprocally on said core pins.

* * * * *

UNITED STATES PATENT AND TRADEMARK OFFICE
CERTIFICATE OF CORRECTION

PATENT NO. : 5,217,728
DATED : June 8, 1993
INVENTOR(S) : Dimitry G. Grabbe

It is certified that error appears in the above-indentified patent and that said Letters Patent is hereby corrected as shown below:

On the title page, item [57] Abstract, line 1, "performs" should be --preforms--.
Col. 3, in claim 1, line 48, "pars" should be --parts--.
Col. 4, in claim 4, line 28, "lest" should be --least--.

Signed and Sealed this

Seventeenth Day of May, 1994

*Attest:*

BRUCE LEHMAN

*Attesting Officer*  *Commissioner of Patents and Trademarks*